E. D. KENDALL.
PLANT FOR THE REDUCTION AND SMELTING OF ORES.
APPLICATION FILED JULY 14, 1914.
1,131,709.
Patented Mar. 16, 1915.
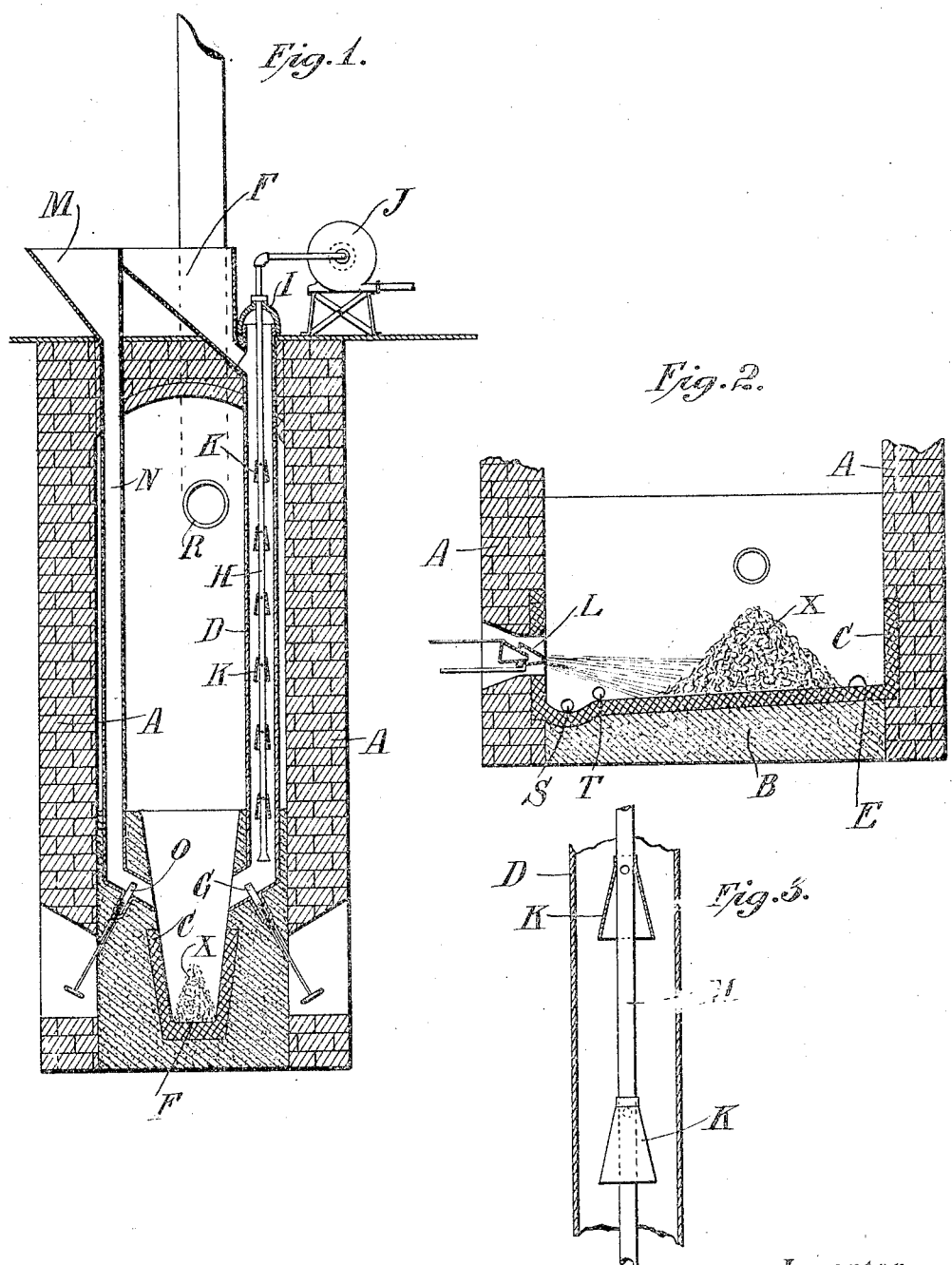
Inventor:
Edward D. Kendall

UNITED STATES PATENT OFFICE.

EDWARD D. KENDALL, OF ELIZABETH, NEW JERSEY, ASSIGNOR OF ONE-HALF TO LOUIS T. HAGGIN, OF CLOSTER, NEW JERSEY, AND MARGARET V. HAGGIN AND ALLAN McCULLOH, OF NEW YORK, N. Y., AND H. ESK. MOLLER, OF MONTCLAIR, NEW JERSEY, EXECUTORS OF JAMES B. HAGGIN, DECEASED.

PLANT FOR THE REDUCTION AND SMELTING OF ORES.

1,131,709.

Specification of Letters Patent.

Patented Mar. 16, 1915.

Application filed July 14, 1914. Serial No. 850,950.

*To all whom it may concern:*

Be it known that I, EDWARD D. KENDALL, of Elizabeth, in the county of Union and State of New Jersey, have invented new and useful Improvements in Plants for the Reduction and Smelting of Ores, of which the following is a specification.

My improvements relate to plants for the chemical reduction of ores of the baser metals and for the smelting of the same and the objects of my invention are to provide means to render practicable and to facilitate the chemical reduction and smelting of metalliferous ores, particularly ores of iron, when in comminuted condition and to render practicable the continuous operation of the processes of reduction and smelting. I attain these objects by the improvements illustrated in the accompanying drawings in which—

Figure 1 is a vertical section of a smelting furnace constructed to include my improvements; Fig. 2 a cross section of part of this furnace at right angle to the drawing in Fig. 1; and Fig. 3 an enlarged cross section of a part of the plant shown in Fig. 1.

Similar letters refer to similar parts throughout the several views.

The walls of a furnace are shown at A, A; this furnace may have any suitable form. As shown in the drawings it has an inner lining of fire-brick, B, at its lower part and within that fire-brick lining a lining, C, of hard refractory material, such as a mixture of quartz and fire clay, or a suitable sandstone, or bauxite, forming the hearth of the furnace.

Within the furnace, and exposed to the escaping products of combustion and the heat thereof, is a conduit, D, formed of wrought iron, or other suitable material, which conducts comminuted ore mixed with carbon, or carbonaceous reducing agent, (and, when required, with fluxing material) to the hearth of the furnace, this mixture of ore and carbon, with or without flux, being supplied from the bin F to a branch pipe from the conduit D and discharged from the lower end of the conduit, either continuously or intermittingly, as required, the discharge being governed by means of the sliding valve G. While the conduit D is intended to conduct a mixture of ore and reducing agent to the hearth of the furnace any proportion of flux—if or when required—may be added to the said mixture, although the presence of fluxing material tends to prevent that intimate contact of ore with the reducing agent which insures the best results.

Within the conduit D is a comparatively small pipe, H, which may or may not be open at its lower end; the upper part of this pipe extends through and is rigidly attached to the cap I which covers the upper end of the conduit D, and the projecting end of this pipe connects, for suction, with the fan J. Rigidly attached to the pipe H, and at short distances apart, are a sufficient number of hoods like K, K, preferably made of sheet iron, and under each of these hoods, and near the upper part thereof, is an opening into the pipe H.

The furnace may be so constructed as to be adapted for any required and suitable source of heat: As shown in the drawing, Fig. 2, the heat is supplied by a liquid-fuel burner, L; by which, in order to produce great heat, petroleum may be sprayed by heated compressed air. Of course a furnace may be so constructed as to use a number of such burners.

Referring to Fig. 1: A bin, M, connects with a conduit, N, having a sliding valve, O, near its lower end which opens a short distance above the hearth E. The purpose of this conduit is to deliver, as required, to the hearth of the furnace, a supply of fluxing material from the bin M. Of course a number of conduits such as D and N may be contained within or connected with a suitably constructed furnace. The opening at R connects with the stack.

The operation of this plant depends largely on the fact that certain metalliferous ores, particularly ores of iron, when in intimate contact with reducing agents are reduced or partially reduced to the metallic state at comparatively low temperatures: Often the applicant has so reduced non-silicated ferric oxids to metallic iron at temperatures not exceeding 400°–450° C.

In operating this plant dry ore, in granular condition, is to be thoroughly mixed with a surplus of carbon or carbonaceous material, preferably in similar form, and this mixture supplied to the conduit D from the bin F, the sliding valve G having been closed. The conduit N is similarly supplied with fluxing material from the bin M. The hearth, E, of the furnace is then to be gradually raised to a high temperature by means of the burner (or burners) L, and after a time, determined by experience, the valves G and O are opened to an extent and for a sufficient time to supply to the hearth E, from the conduit D, a charge of the iron ore, now entirely or partially reduced to the metallic state, mixed with surplus carbon, while a proportionate quantity of flux from the conduit N is added to form the charge X. Under continued intense heat the iron is carbureted and fused and is to be drawn from the furnace through the opening S, while the slag flows out through the opening T. Under favorable conditions as to ores, reducing agents, readily fusible fluxes and regulated temperatures the operation of this plant may be continuous.

During the chemical reduction of the ores under heat large volumes of fixed gases are rapidly generated and these gases could not find egress through a long column of granular material—could only transude through a stratum of such material of limited height or thickness; it is necessary that the conduit D shall extend to a considerable height within the furnace and flue and that the greater part of its length shall be subjected to heat in order that its descending contents shall be gradually and sufficiently heated and for a sufficient length of time; the hoods, K, K, shield openings in the pipe H which are placed at such short distances apart that only comparatively small bodies of the comminuted contents of the conduit D oppose the escape of the generated gases through the said openings and these gases freely escaping into the pipe H are thereby conducted to the fan J which by adjusted velocity aids in removing the gases and delivering the same to be utilized or discharged into the atmosphere.

Referring to this specification and the drawings, I claim—

1. In a plant of the character described, a furnace having within its walls, and so arranged that it may be subjected to heat, a conduit for ore or ores and reducing agent or agents and within the conduit a removable pipe for the escape and transmission of gases generated within the conduit, the said pipe having through its sides a multiplicity of openings protected by hoods, as and for the purpose described.

2. In a plant of the character described, a furnace having within its walls, and so arranged that it may be subjected to heat, a conduit for ore or ores and reducing agent or agents and within the conduit a removable pipe for the escape and transmission of gases, generated within the conduit, the said pipe having through its sides a multiplicity of openings protected by hoods and being connected at its delivering end with an exhausting fan, as and for the purpose described.

3. In a plant of the character described, a furnace having within its walls, and so arranged that it may be subjected to heat, a conduit for ore or ores and reducing agent or agents, the interior of the conduit being connected by a multiplicity of openings with the interior of a pipe for the escape and transmission of gases generated within the conduit, the said openings being protected by suitable hoods, and the said furnace being provided with a separate conduit for fluxing material, substantially as described.

EDWARD D. KENDALL.

Witnesses:
F. M. West,
Ralph C. Mason.